(12) United States Patent
Lienkamp et al.

(10) Patent No.: US 8,173,311 B2
(45) Date of Patent: May 8, 2012

(54) METHOD FOR DYNAMIC ADAPTIVE RELATIVE HUMIDITY CONTROL IN THE CATHODE OF A FUEL CELL STACK

(75) Inventors: Sebastian Lienkamp, Budenheim (DE); Matthew C. Kirklin, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 902 days.

(21) Appl. No.: 11/678,804

(22) Filed: Feb. 26, 2007

(65) Prior Publication Data

US 2008/0206608 A1    Aug. 28, 2008

(51) Int. Cl.
*H01M 8/04* (2006.01)
(52) U.S. Cl. .................. 429/428; 429/443; 429/450
(58) Field of Classification Search .......... 429/13, 429/22, 428, 429, 430, 433, 443, 444
See application file for complete search history.

(56) References Cited

U.S. PATENT DOCUMENTS

| | | | |
|---|---|---|---|
| 6,383,671 B1 | 5/2002 | Andrews et al. | |
| 6,777,120 B2* | 8/2004 | Nelson et al. | 429/22 |
| 6,787,254 B2 | 9/2004 | Cargnelli et al. | |
| 6,872,484 B2 | 3/2005 | Katagiri et al. | |
| 6,953,635 B2 | 10/2005 | Suzuki et al. | |
| 2001/0035215 A1 | 11/2001 | Tipton et al. | |
| 2002/0127448 A1* | 9/2002 | Derflinger et al. | 429/24 |
| 2003/0022034 A1* | 1/2003 | Suzuki | 429/13 |
| 2003/0072980 A1* | 4/2003 | Formanski et al. | 429/13 |
| 2007/0287041 A1* | 12/2007 | Alp et al. | 429/22 |

FOREIGN PATENT DOCUMENTS

| | | |
|---|---|---|
| DE | 10222423 A1 | 5/2002 |
| EP | 1526598 A1 | 4/2005 |

OTHER PUBLICATIONS

Pischinger et al, Analysis of Dynamic Requirements for Fuel Cell Systems for Vehicle Applications, Journal of Power Sources, 154, (2006) 420-427.*

* cited by examiner

*Primary Examiner* — Emily Le
*Assistant Examiner* — Michael Forrest
(74) *Attorney, Agent, or Firm* — Dinsmore & Shohl LLP

(57) ABSTRACT

A fuel cell system and method for controlling relative humidity in a fuel cell system. A controller can be signally coupled to one or more sensors and configured to operate at least one flow manipulation device in response to changes in a relative humidity of a reactant passing through the cathode flowpath of the fuel cell in order to maintain the relative humidity within a prescribed range. The controller correlates one or more of a temperature setpoint, pressure setpoint, stoichiometry setpoint or actual operating condition of any of them to an operating condition of the system. In this way, a desired level of relative humidity can be achieved, maintained or both while minimizing the use of power-robbing flow manipulation devices, such as a pump, compressor, fan or related component.

21 Claims, 6 Drawing Sheets

METHOD FOR DYNAMIC ADAPTIVE RELATIVE HUMIDITY CONTROL IN THE CATHODE OF A FUEL CELL STACK

BACKGROUND OF THE INVENTION

The present invention relates generally to controlling the relative humidity of a reactant stream in a fuel cell system, and more particularly to manipulating the operation of cathode components in such a way as to reduce system-level performance penalties associated with such airflow manipulation.

In a typical fuel cell system, hydrogen or a hydrogen-rich gas is supplied through a flowpath to the anode side of a fuel cell while oxygen (such as in the form of atmospheric oxygen) is supplied through a separate flowpath to the cathode side of the fuel cell. Catalysts, typically in the form of a noble metal such as platinum, are placed at the anode and cathode to facilitate the electrochemical conversion of hydrogen and oxygen respectively. In one form of fuel cell, called the proton exchange membrane (PEM) fuel cell, an electrolyte in the form of a proton-transmissive membrane is sandwiched between the anode and cathode to produce a layered structure commonly referred to as a membrane electrode assembly (MEA). Each MEA forms a single fuel cell, and many such single cells can be combined to form a fuel cell stack, increasing the power output thereof. Multiple stacks can be coupled together to further increase power output. The PEM fuel cell has shown particular promise for vehicular and related mobile applications, using hydrogen and oxygen as the primary reactants to produce electricity with water vapor as a non-polluting reaction byproduct.

Balanced moisture or humidity levels are required in the PEM fuel cell to ensure proper operation and durability. For example, it is important to avoid having too much water in the fuel cell, which can result in the blockage of the porous anode and cathode, thereby preventing the flow of reactants. Contrarily, too little hydration limits electrical conductivity of the membrane, and in extreme cases can lead to premature wearing out of the membrane. Water wicking and related devices may be used in situations where there is a danger of electrode flooding. Nevertheless, of the situations where there is too much or too little hydration in the fuel cell, it is the latter that is more frequently addressed. One potential method of ensuring adequate levels of hydration throughout the fuel cell includes humidifying one or both of the reactants before they enter the fuel cell by one or more external humidification devices, including condensing heat exchangers, water injection and separate water reservoirs. Still another potential method of ensuring adequate levels of hydration includes humidifying one or both of the reactants with a water vapor transfer device. In such a device, fibrous tubes, water-permeable membranes or similar devices capable of providing capillary or related water transfer action can be used to effect the transfer of moisture from one stream to the other, where the moisture extracted can be reintroduced (typically in vapor form) into portions of the fuel cell that require additional moisture. Both are effective at improving the humidification of the fuel cell, but involve greater system complexity and cost, as well as take up space. This is especially troublesome in vehicle-based applications, where such componentry must compete with passenger space or other features.

Absent the use of external devices to augment the humidity of the cathode inlet airstream, the relative humidity RH at fuel cell cathode outlet can be varied by adjusting gas temperature, water fraction caused by the catalytic air/proton reaction at the cathode, and local absolute pressure. Generally, the relationship between the relative humidity at the stack cathode outlet and these parameters can be expressed by the following equations:

$$RH = \frac{p_{cathodeout} * wf_{cathodeout}}{p_{saturated}} \quad (1)$$

and $$p_{saturated} = f(T_{csathodeout}) \quad (2)$$

where $p_{cathodeout}$ is the ambient pressure at the cathode outlet, $wf_{cathodeout}$ is the water fraction, and $p_{saturated}$ is the saturated vapor pressure of the water, which in the present context is a measure of the ability of the air to dry out the fuel cell, where the higher the value, the greater the drying tendency. This last quantity is strongly dependent upon the temperature in the outlet of the cathode $T_{cathodeout}$. Using water as an example, at a temperature of −20° C., the saturation pressure is about 0.1 kPa, at 0° C., it is about 0.6 kPa, at 20° C., it is about 2.3 kPa, at 50° C., it is about 12.3 kPa and at 90° C. it is about 70.1 kPa. From this trend, it can be seen that the relationship between temperature and saturation pressure is highly nonlinear. Since many fuel cells (including PEM fuel cells) operate at high temperatures, the relatively modest drying effect of air (i.e., the rate of evaporation of the water) at lower temperatures will generally not apply, but becomes significant or even extensive at higher temperatures.

Regarding temperature, the minimal stack temperature, shown as line (1) in FIG. 1A, is a function of the heat loss of the stack, which in turn is a function of load, the performance of the cooling system, vehicle speed and ambient temperature. The temperature can be increased, as shown by line (2) of FIG. 1A, by bypassing a radiator and stopping a fan (both as typically found in fuel cell integrated into a vehicular embodiment of a fuel cell system) until the maximum permitted stack temperature is reached or the equilibrium of stack heat loss and system heat radiation/convection is reached. The cathode outlet gas pressure (discussed below) will, due to the strong thermal coupling, equal the coolant temperature. In this way, the outlet RH is directly influenced by varying the coolant outlet temperature.

Regarding water fraction, the relation between airflow and product water is not constant over the operating range, as shown in FIG. 1B. The water fraction, the production of which is proportional to the amount of oxygen consumed in the catalytic reaction, depends on the stoichiometry, which is the ratio between oxygen provided to the cathode inlet and consumed oxygen. Higher stoichiometry therefore produces lower water fraction and eventually lower relative humidity. As can be seen in the figure, the stoichiometry may need to be increased at low current (i.e. current density) levels to maintain stack stability. To do this may require forced operation of airflow supply devices, such as a compressor or related pump.

Furthermore, stoichiometry may be increased to achieve a lower relative humidity. There are limits as to how much the stoichiometry can be increased, for example, compressor capability and related noise limits (which could be adversely impacted by higher compressor operating speeds and increased airflow) should not be exceeded because as a general prospect, the most significant limitation on stoichiometry is the capacity of the equipment used to pass the air through the cathode flowpath. Moreover, extended running of the compressor consumes a lot of power that reduces the overall system efficiency considerably. This is disadvantageous because electricity required to run the compressor reduces the amount available to power a load, such as a vehicular drivetrain. Thus, from a practical perspective, the stoichiometry could be kept below a certain threshold to keep the compressor from operating at high (and concomitantly noisy) conditions.

Regarding pressure, as shown in FIG. 1C, there is a minimum stack cathode outlet pressure $p_{cathode,out}$ that exists, even in situations where throughflow impediments to the cathode flowpath are minimized, such as when a backpressure valve is fully opened. Outlet pressure goes up with increasing airflow. Cathode outlet pressure $p_{cathode,out}$ can be increased by closing a downstream flow manipulation device (such as the aforementioned backpressure valve) in order to increase relative humidity RH. Again, this is disadvantageous because electricity required to run the compressor reduces the amount of available power, which reduces overall system efficiency. Limitations on compressor capacity also mean that there is an upper limit on the amount of backpressure created.

One solution to proper operating conditions is to have the pressure setpoint be derived from actual temperatures and temperature setpoint from actual pressure. While this has the advantage of permitting dynamic, real-time control, the interrelationship of the parameters can produce a phenomenon known as windup, where changed pressure and temperature setpoints can effectively lock in operation at conditions that may be suitable for one operating condition, but not at other conditions. An example of the windup phenomenon is as follows: a high load condition forces a high system temperature assuming the cooling system is operating at its limit, which in turn causes the pressure setpoint to go up to avoid dropping of the stack cathode outlet RH. If now the load drops, the cooling system would be able to maintain a lower temperature again; however, temperature will only drop very slowly, thereby keeping the pressure setpoint up. The resulting high actual pressure would then force a high temperature setpoint which in turn will keep the temperature up despite the fact that the cooling system could maintain a lower temperature. This is disadvantageous in that it locks the system into a high pressure, high temperature condition, even when low temperature, low pressure conditions (with concomitant reductions in compressor power requirements) would otherwise be possible and most beneficial to the system.

As shown above, the pressure and temperature setpoints should be decoupled. Thus, if the temperature setpoint is not based on actual pressures (i.e., the temperature setpoint is not a function of the actual pressure) a wind-up of the setpoints could be avoided.

What is desired is a way to manipulate the relative humidity within a fuel cell while simultaneously minimizing performance impacts to the overall system. What is further desired is a way to choose proper operational setpoints for pressure, temperature and stoichiometry within limits commensurate with such minimized performance impacts. What is further desired is to maintain a fuel cell stack outlet RH that enables best MEA performance and durability during dynamic fuel cell operation by continuously adjusting cathode stoichiometry, cathode outlet pressure and outlet temperature.

BRIEF SUMMARY OF THE INVENTION

These desires are met by the present invention, wherein a method of operating the system that incorporates the features discussed below is disclosed. In particulars the manipulation of one or more cathode operating conditions, including pressure, temperature, stoichiometry or the like can be used to maintain the desired humidity levels in the fuel cell. In one basic form, a temperature can be chosen that achieves the desired relative humidity (also referred to as a relative humidity setpoint) while allowing minimal pressure and stoichiometry levels to optimize the system efficiency. The present invention focuses on computing setpoints for fuel cell stack cathode outlet temperature and pressure while maintaining the desired RH setpoint despite some of the aforementioned restrictions for achievable pressures and temperatures within a system incorporating such fuel cell.

In accordance with a first aspect of the present invention, a fuel cell system is disclosed. The system includes one or more fuel cells, each with an anode, a cathode and an electrolyte disposed between the anode and the cathode. In addition anode and cathode flowpaths are configured to convey reactants (such as fuel and oxygen) to the respective electrode. The cathode flowpath, which defines conduit or related fluid-carrying means, includes a cathode inlet and a cathode outlet, where the inlet is used to convey oxidant (such as air) into the fuel cell cathode for reaction with an appropriate reductant (such as hydrogen) that passes through the electrolyte and to the cathode. Electricity generated during the operation of the fuel cell can be used to power the compressor or other power-consuming ancillaries, thereby reducing the net power produced by the fuel cell system that is available for driving a load (such as a vehicle traction system or the like). At least one pump is fluidly coupled to the cathode flowpath, and at least one valve is fluidly disposed in the cathode flowpath downstream of the fuel cell stack. In addition, numerous sensors are coupled to the cathode flowpath such that upon passage of the reactant through the cathode flowpath and adjacent the sensors, the sensors generate a signal corresponding to a characteristic of the reactant. The sensors may include one or more of a mass flow sensor, temperature sensor and pressure sensor. The signals they generate are routed to a controller. This invention does not require a relative humidity or dewpoint temperature sensor at stack cathode outlet. This is advantageous, as such sensors usually are not capable of reliable and accurate operation in the given harsh environment due to temporarily occurring liquid water or the like. The system also includes a coolant loop thermally coupled to the fuel cell.

The controller is configured to operate as a feedback system, where it receives input from one or more of the sensors, and provides operating instructions to one or more components within the system in an attempt to achieve a desired relative humidity in the stack outlet of the cathode flowpath. The controller may be microprocessor-based, such that the input signals from the sensors can be used in a program or related algorithm to calculate commands for actuators in the system. The controller is further configured to operate at least one of the pumps and the valve in response to changes in a relative humidity of the reactant in the cathode flowpath in order to maintain the relative humidity within a prescribed range. In operation, the controller correlates at least one of a temperature setpoint, pressure setpoint and stoichiometry setpoint to an operating condition of the system, thereby maintaining the relative humidity while simultaneously minimizing operation of the pump or other power-consuming components. Note that the value of such a setpoint is generally dependent on stack technology. In other words, it is a fixed parameter in the software that is defined beforehand (such as when the algorithm is programmed) and is usually not changed during normal system operation. Nevertheless the setpoint may be altered during a shut-down sequence or a remedial action to change the level of membrane hydration.

The coolant loop may include a pump, radiator, bypass valve and fan, where the bypass valve is signally coupled to the controller such that upon attainment of a certain temperature threshold, the controller can actuate the bypass valve to adjust a flow of coolant through the coolant loop. Like the bypass valve, the fan can be signally coupled to the controller such that upon attainment of a certain temperature threshold, the controller can actuate the fan to adjust a temperature of coolant flowing through the coolant loop. The temperature setpoint is derived from the minimal stoichiometry that ensures stable stack operation and upon a minimum backpressure value that corresponds to the backpressure valve being in a fully open condition. Such minimal stoichiometry is preferable to starting from the actual stoichiometry setpoint, which could be higher than the minimal stoichiometry under certain (for example, cold) conditions. Starting from the actual stoichiometry setpoint could disadvantageously lead to the aforementioned windup condition. The controller is configured to determine the minimum backpressure value for the desired load while the system is operating, thereby avoiding the need to recalculate or otherwise reconfigure the controller while off-line. Changes in backpressure may occur if the system is operated with different configurations. For example, a vehicle incorporating a fuel cell system according to an aspect of the present invention may also feature a longer wheelbase or overall length which leads to a longer cathode air exhaust path to the rear-end of the vehicle and thereby to a higher backpressure. Such variations and their impact on operation are within the scope of the present invention. The system may further comprise a humidification device fluidly coupled to the cathode flowpath and signally coupled to the controller such that upon attainment of an appropriate signal from the controller, the humidification device can contribute to maintaining the desired level of relative humidity.

In more particular options, the fuel cell system is part of a vehicle such that the system is a source of motive power. Even more particularly, the vehicle may include a platform configured to carry the source of motive power, a drivetrain rotatably connected to the platform such that the drivetrain is responsive to output from the source of motive power, and numerous wheels connected to the drivetrain.

According to another aspect of the invention, a method of operating a fuel cell system is disclosed. The method includes configuring at least one fuel cell system substantially as discussed above in the previous aspect. Numerous flow modification devices are coupled to the cathode flowpath. In the present context, flow modification devices may include passive components, such as valves, as well as active (i.e., powered or power-consuming) components. Some components may have both active and passive attributes. For example, motorized or solenoid valves are actively controlled, but tend to consume far less power than other devices, such as compressors.

A reactant suitable for the cathode flowpath is introduced. While there is no need to sense the stoichiometry directly, as it can be derived from the mass flow into the stack cathode and stack current, there are situations where it may be beneficial to work with a desired stoichiometry instead of the actual stoichiometry. For example, starting from the actual air flow and the actual current would give an actual stoichiometry value that can fluctuate heavily under certain conditions, such as if the actual stack current has to be reduced in case of cell voltage problems. To avoid an impact of this fluctuation on temperature and pressure control, such controls are preferably (although not necessarily) based on the desired stoichiometry, where algorithms configured to operate with a controller ensure that actual and desired stoichiometry match in average on the long run. The controller can manipulate at least one of the flow modification devices or the gas temperature at the stack cathode outlet to substantially attain the desired relative humidity. In cases where flow modification devices are being manipulated, such manipulation is based on an algorithm that minimizes the use of power required to actuate the flow modification devices.

Optionally, the flow modification devices comprise electrically-powered devices; such devices derive their power from the operating fuel cell, thereby reducing the net power output therefrom. Examples of electrically-powered devices that may be used include a cooling fan and a compressor. The cooling fan is in thermal communication with a coolant loop that is in turn in thermal communication with the cathode flowpath. The compressor is in fluid communication with the cathode flowpath. The method may additionally include configuring a humidification device to be in fluid communication with the cathode flowpath. The humidification device is responsively coupled to the controller and configured to selectively introduce additional humidity into the cathode flowpath. Other devices, such as a chilled water source for cooling, may also be incorporated into the system. In a particular form of operation, a temperature setpoint is based on an optimal pressure such that maintenance or attainment of the relative humidity (i.e., a relative humidity setpoint) occurs with a minimal amount of parasitic power consumption.

According to another aspect of the invention, a method of regulating relative humidity in a fuel cell system is disclosed. The method includes sensing one or more of a temperature, pressure and a flow associated with fluid flowing through a cathode flowpath of the system, introducing the fluid into the cathode flowpath and adjusting at least one of the temperature, pressure and flow associated with the fluid to either substantially attain or maintain a desired relative humidity. A controller (such as that described in conjunction with the previous aspects) may be used to calculate a desired relative humidity based on an actual operational status of the fuel cell system. The adjusting is done in such a way to minimize parasitic power loss to the system. In the present context, a parasitic power loss is distinguished from the load (or other primary power draw) in that it is used to primarily provide power to ancillary equipment. In one preferred option, the parasitic power loss comprises power loss associated with operation of at least one of a compressor fluidly coupled to the cathode flowpath and a fan thermally coupled to the cathode flowpath. A desired level of pressure (i.e., a pressure setpoint) is based at least in part on a desired temperature level (i.e., a temperature setpoint), which is in turn based on an optimal pressure such that maintenance or attainment of the desired relative hamidity (i.e., relative humidity setpoint) occurs with a minimum amount of parasitic power loss.

BRIEF DESCRIPTION OF THE SEVERAL VIEWS OF THE DRAWINGS

The following detailed description of the present invention can be best understood when read in conjunction with the following drawings, where like structure is indicated with like reference numerals and in which.

DETAILED DESCRIPTION OF THE PREFERRED EMBODIMENTS

Figure 1A:
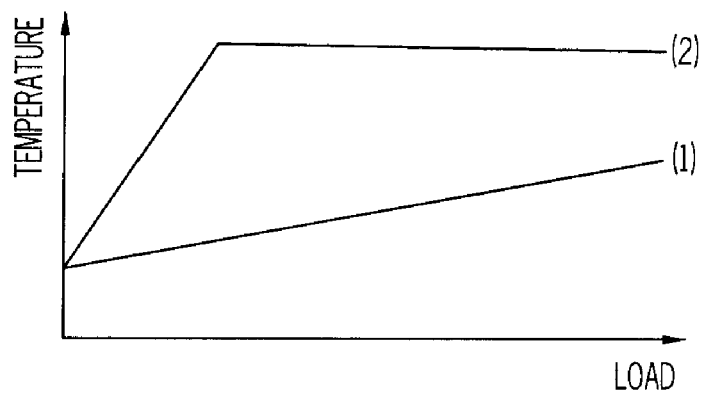
FIGS. 1 through 1C show various relationships that impact the relative humidity control in a fuel cell system flowpath, including the minimal and maximal temperature, minimal stoichometry and minimal backpressure as constraints on how to manipulate the relative humidity.
Figure 1B:
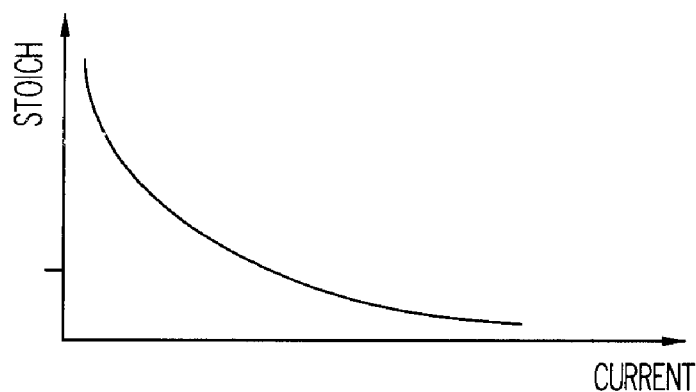
Figure 1C:
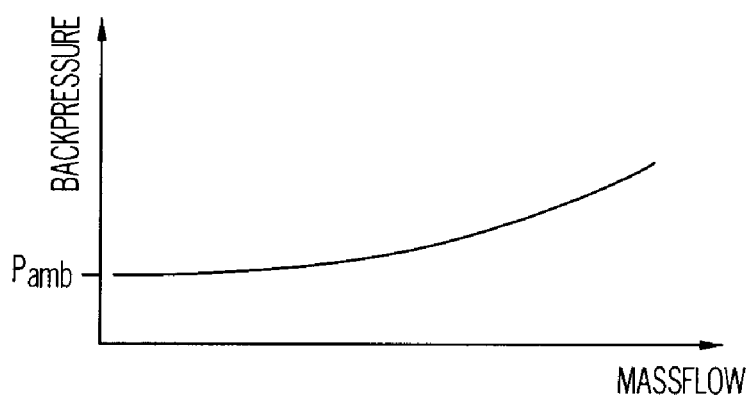
Figure 2:
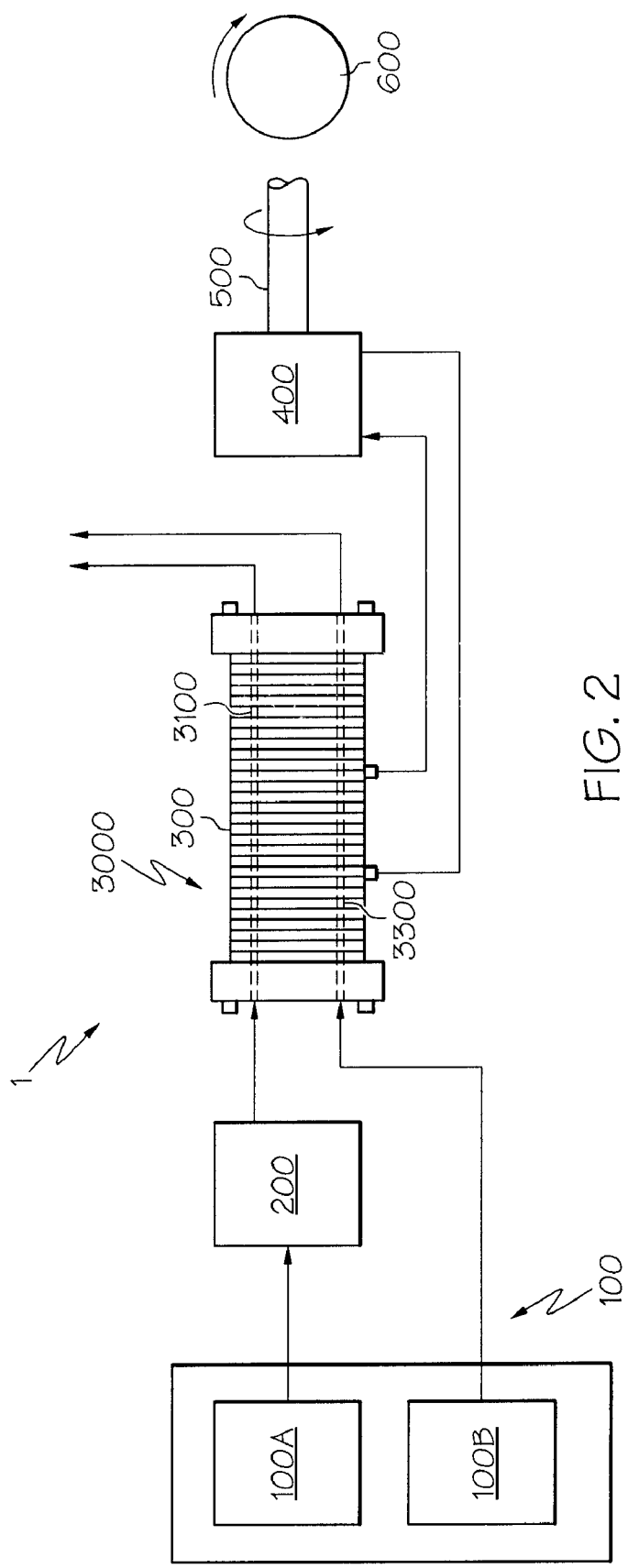
FIG. 2 shows a block diagram of a fuel cell system, including a fuel cell stack, configured for vehicular application.
Figure 6:
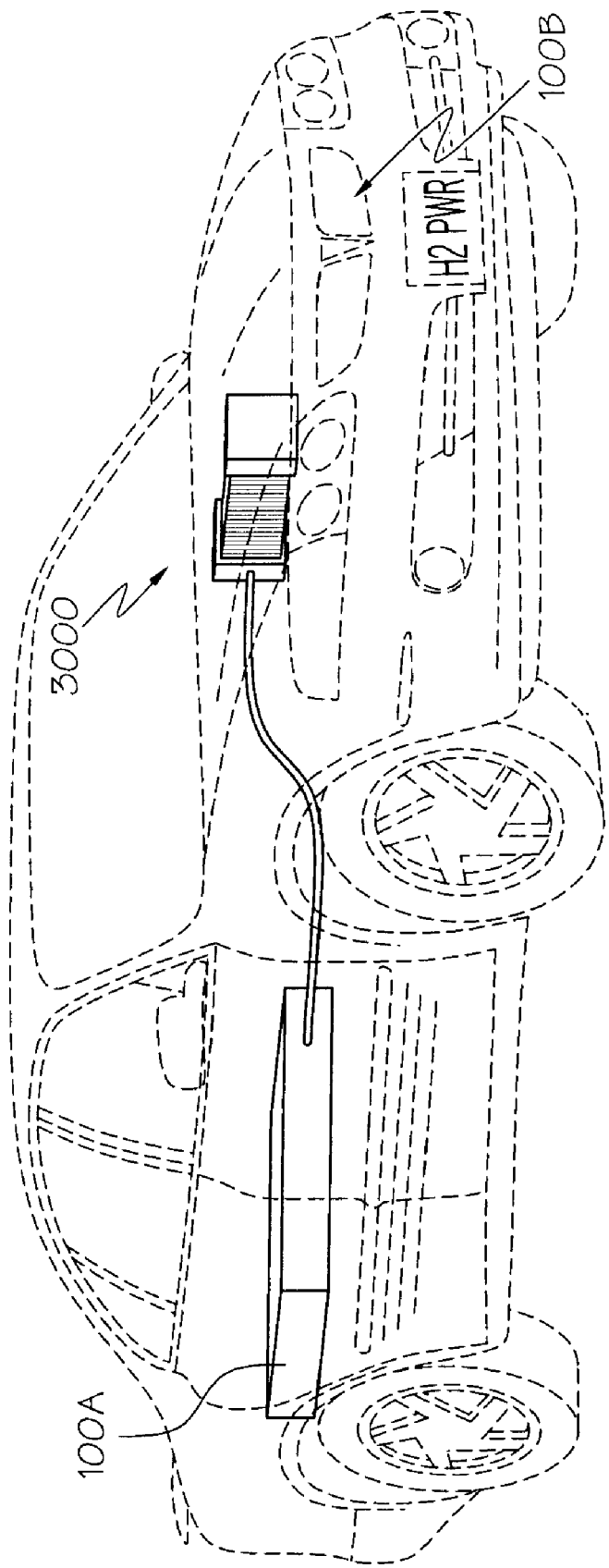
FIG. 6 shows a vehicle employing the fuel cell system of the present invention.

Referring initially to FIGS. 2 and 6, a block diagram highlights the major components of a mobile fuel cell system 1 according to the present invention (FIG. 2), as well as a representative placement of a fuel cell system into an automotive application (FIG. 6). Referring with particularity to FIG. 2, the system 1 includes a fuel delivery system 100 (made up of fuel source 100A and oxygen source 100B), fuel processing system 200, fuel cell 300, optional energy storage device 400, a drivetrain 500 and one or more motive devices 600, showh notiotnally as a wheel. While the present substem 1 is shown for mobile (such as vehicular) applications, it will be appreciated by those skilled in the art that the use of the fuel cell 300 and its ancillary equipment is equally applicable to stationary applications. It will also be appreciated by those skilled in the art that other fuel delivery and fuel processing systems are available. For example, there could be some variants where substantially purified fuel is already available, the fuel processing system 200 may not be required. The optional energy storage device 400 can be in the form of one or more batteries, capacitors, electricity converters, or even a motor to convert the electric current coming from the fuel cell 300 into mechanical power such as rotating shaft power that can be used to operate drivetrain 500 and one or more motive devices 600. The fuel processing system 200 may be incorporated to convert a raw fuel, such as methanol into hydrogen or hydrogen-rich fuel for use in fuel cell 300; otherwise, in configurations where the fuel source 100A is already supplying substantially pure hydrogen, the fuel processing system 200 may not be required. An air delivery system may be disposed between the oxygen source 100B and the cathode of each fuel cell 300 and, as described below, is used to manipulate the flow of incoming air from oxygen source 100B.

Figure 3:
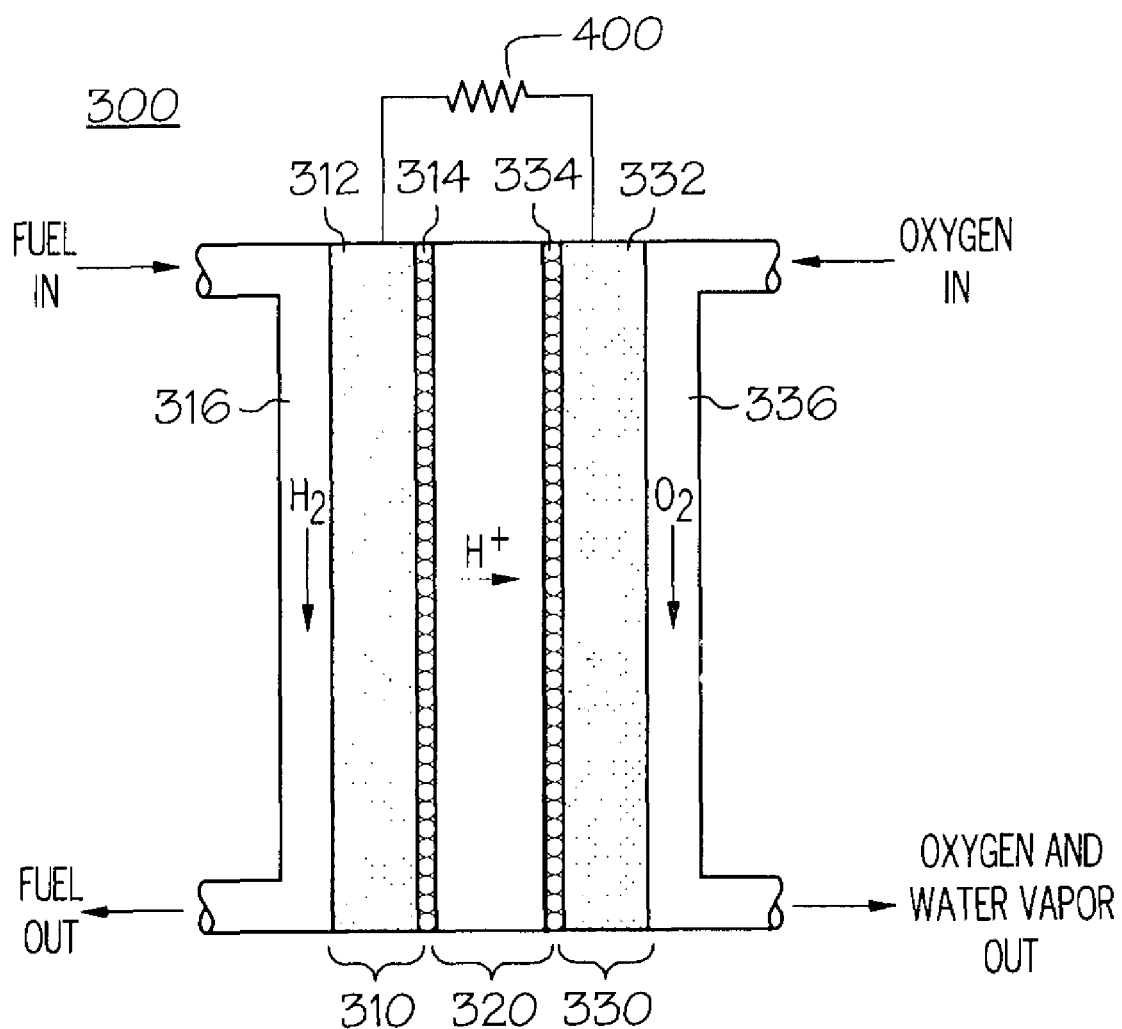
FIG. 3 shows a representative single fuel cell that is used to make up the fuel cell stack of FIG. 2.

Referring next to FIG. 3, each fuel cell 300 within stack 3000 includes an anode 310, cathode 330, and an electrolyte layer 320 disposed between anode 310 and cathode 330. the anode 310 includes an electrode substrate 312 and catalyst layer 314 connected to a flow channel 316. The cathode 330 includes an electrode substrate 332 and catalyst layer 334 connected to a flow channel 336. Flow channels 316, 336 form the part of an anode flowpath and cathode flowpath that act as conduit for delivering reactants to their respective anode and cathode. In a preferred (but not necessarily exclusive) embodiment, the reactant being routed through flow channel 316 is hydrogen, while that being routed through flow channel 336 is air or related oxygen-rich fluid. It is qualities of that air, including at least pressure, temperature and mass flow, that the present invention is configured to manipulate in order to optimize the relative humidity within fuel cell 300. Preferably, the electrode substrates 312, 332 are porous to allow diffusion of fuel and oxygen, as well as the flow of water that forms as a result of the fuel-oxygen reaction. The catalyst layer 314 is made up of a catalyst (not shown) dispersed on the surface of a support (not shown). The electrolyte layer 320, shown presently in the form of a proton exchange membrane, is placed between each of the anode 310 and cathode 330 to allow the ionized hydrogen to flow from the anode 310 to the cathode 330 while inhibiting the passage of electrical current therethrough.

Fuel (typically in the form of gaseous hydrogen) passes through flow channel 316, allowing the fuel to diffuse through electrode substrate 312 and come in contact with the catalyst, through which the electrochemical oxidation of the hydrogen fuel proceeds by what is believed to be a dissociate adsorption reaction. This reaction is facilitated by the catalyst, typically in the form of finely-divided particles of a noble metal (such as platinum) that are dispersed over the surface of the support, which is typically carbon-based. The positively-charged hydrogen ion (proton) produced at the anode 310 then passes through the electrolyte 320 to react with the negatively-charged oxygen ions generated at the cathode 330. The flow of liberated electrons sets up a current through the load 400 such that a motor or related current-responsive device may be turned. Load 400, shown in the form of the previously-discussed energy storage device, completes an electrical flowpath between the anode and cathode of fuel cell 300. An additional pump (not shown) can be included to remove from the electrode substrates 312, 332 water that would otherwise collect and possibly block the porous passageways.

Figure 4:
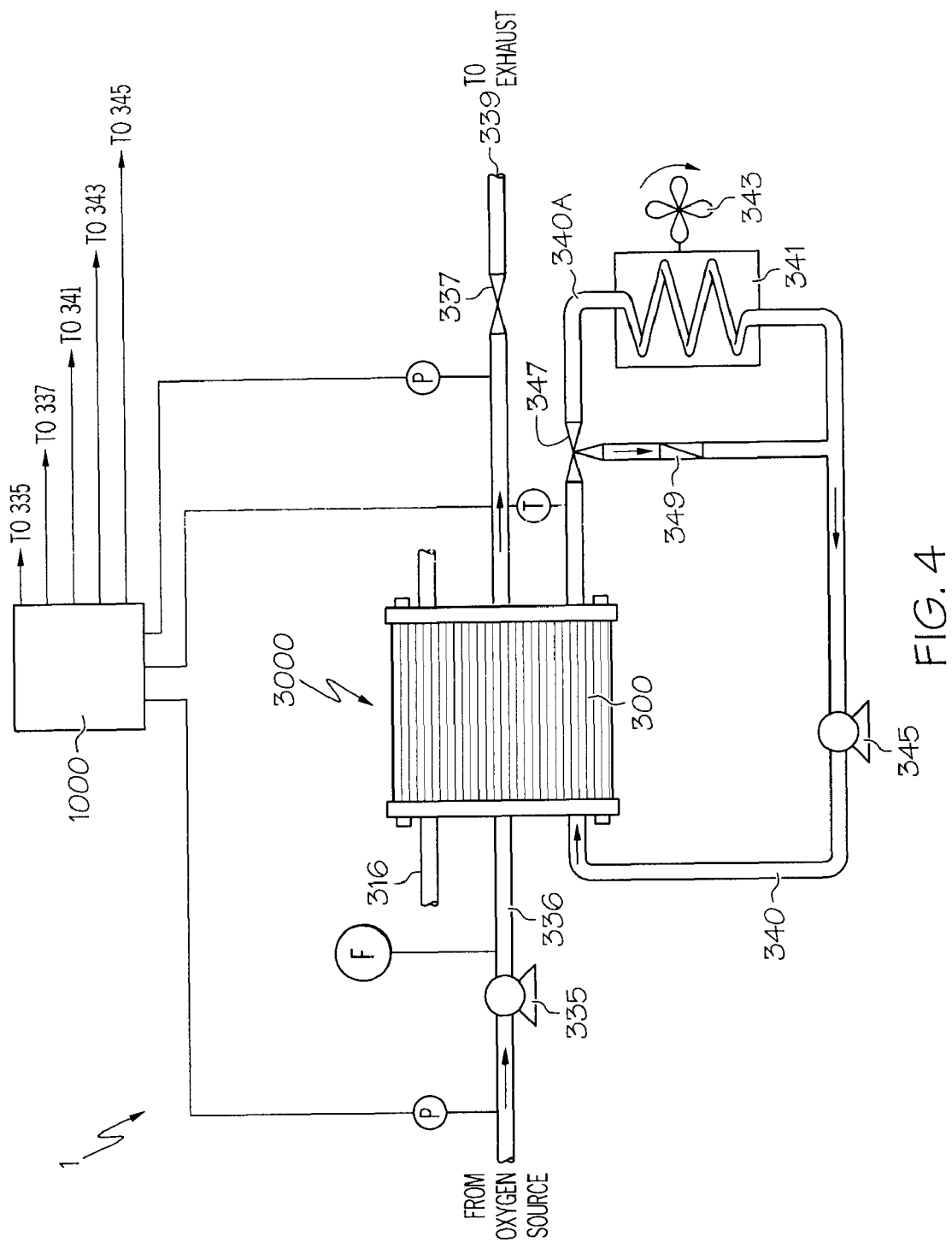
FIG. 4 shows a block diagram of components according to the present invention that are used to regulate the relative humidity of the fuel cell stack of FIG. 2.

Referring next to FIG. 4, details of a system configuration adapted to regulate relative humidity according to an embodiment of the invention are shown. Anode flowpath 316 is shown in simplified form, and but for its inclusion as part of one of the two reactant-conveying flowpaths coupled to stack 3000, will not be discussed further. Cathode flowpath 336 includes inlet conduit fluidly connected to an oxygen source 100B (shown in FIG. 2) such that an oxygen-bearing fluid (such as air) can be delivered to the inlets of the various cathodes, and where a pump (hereinafter referred to as a compressor) 335 can be used to facilitate fluid flow through the stack 3000. In one configuration, compressor 335 can be a screw compressor, although other configurations are also within the scope of the invention. Air generated by compressor 335 enters the cathode flowpath 336 at elevated temperature as a result of the compression. Once the oxygen-bearing fluid has passed through the stack 3000, it flows through outlet conduit, backpressure valve 337 and exhaust 339. One or more pressure sensors P and one or more mass flow sensors F are coupled along various places in cathode flowpath 336 to sense respectively the pressure and flow rate of the fluid passing therethrough. These and other sensors (discussed below) are signally connected to controller 1000 (discussed in more detail below). A coolant loop 340 is used to regulate the temperature within the stack 3000, including the temperature of the cathode flowpath 336. The coolant (which may be, among other things, water) is circulated in a generally co-flow arrangement with the oxygen-bearing fluid that passes through the cathode flowpath 336. A pump or related compressor 345 is fluidly disposed in the coolant loop 340 to facilitate the circulation of coolant. The coolant loop 340 includes parallel branches 340A and 340B separated by bypass valve 347. Branch 340A includes a radiator 341 and accompanying fan 343 that can be used to exchange heat with an external heat sink (such as air in the ambient environment) in order to keep the temperature of the coolant down. One or more temperature sensors T can be coupled to the coolant loop 340 and signally connected to the controller 1000 to provide information relating to the temperature of the coolant. In situations where a sensed temperature is above a threshold value, bypass valve 347 can be instructed to route some or all of the coolant away through branch 340A. If the temperature of the coolant does not drop even after being routed through branch 340A, then the fan 343 may commence operation to provide convective cooling to the coolant. In situations where a sensed temperature is below a threshold value, bypass valve 347 can be instructed to route some or all of the coolant away from branch 340A and into branch 340B. A check valve 349 may be disposed in the branch 340B to avoid backflow.

It is desirable to let the fuel cell stack 3000 run as hot as possible without exceeding the limits of its individual components, as this minimizes the use of electricity-consuming components, such as fan 343. As can be seen from equation (1), relative humidity goes down with temperature, and goes up with ambient pressure. From equation (3), it can be seen that the molar fraction of water (an indicia of relative humidity) goes down with increasing stoichiometry values. In addition, while the ambient pressure goes up with air flow, there are limits on the amount of air that can be provided by compressor 335. Similarly, it is desirable to have the back pressure be as low as possible, as this minimizes the use of the compressor, which is a significant drain on electricity produced by the stack 3000. One way to help achieve this is to keep the back pressure valve 337 as open as possible. Of course, there are limits to how open the valve 337 can be, as temperature effects come into play. From an operability standpoint, it is desirable to provide just as much stoichionietry as is needed by the amount of current generated in the catalytic air/proton reaction. An excess stoichiometry, while easy to provide, undesirably requires additional compressor operation. Likewise, at very high generated current levels, the compressor 335 only can provide a minimum stoichiometry.

Controller 1000 is used to determine which components should be operating to manipulate the air coming into the cathode flowpath 336. More particularly, controller 1000 can be used to establish temperature, stoichiometry and pressure setpoints in order to regulate relative humidity in such a way that the use of parasitic devices (such as the compressor 335 and fan 343) are reduced. As stated above, numerous air parameter measuring sensors, such as air mass flow sensor F, temperature sensor T and pressure sensor P can be used to provide signals to controller 1000. The controller 1000 includes a feedback loop in signal communication with the sensors F, T and P to react to a value sensed thereby. Controller 1000 communicates with the various components of fuel cell system 1 to coordinate their operation. For example, controller 1000 communicates with compressor 335 to control the quantity of cathode reactant supplied to fuel cell stack 3000. Controller 1000 also communicates with the coolant loop 340 to control the temperature of the cathode reactant flowing through fuel cell stack 3000. Controller 1000 may be a single controller or multiple controllers whose actions are coordinated to provide a desired overall operation of fuel cell system 1. Furthermore, controller 1000 may include one or more modules, as needed, to perform the functionality indicated. As used herein, the term "module" refers to an application specific integrated circuit (ASIC), an electronic circuit, a processor (shared, dedicated or group) and memory that execute one or more software or firmware programs, a combinational logic circuit, or other suitable components that provide the desired functionality. In one form, a processor or logic module (not shown) can be used to provide overall coordination of the controller activities, as well as include arithmetic functions to determine whether manipulation of one or more components within system 1 is needed. A linkage module (not shown) may be signally connected to an ammeter or related current sensing device to enable load monitoring. A storage module (not shown) can be used to store time and time passage, as well as load and setpoint (including temperature, pressure and stoichiometry) information. Other modules may be included, depending on the functional requirements of the system 1.

The temperature setpoint is primarily based on a fraction estimation that itself is derived from the desired cathode stoichionietry. Taking the desired stoichionietry instead of actual values avoids setpoint oscillations due to diagnostic functions decreasing the actual load momentarily. Furthermore, changes in stoichiometry setpoint during runtime can be implemented easily, through for example user input. The fraction derived from the stoichiometry setpoint can be shown as follows:

$$y_{H2O, out, est} = \frac{2}{1 + \frac{\lambda}{y_{O2, in}}} \qquad (3)$$

where $\lambda$ equals the cathode stoichiometry and $y_{H2Ooutest}$ equals the molar fraction. Examples of desirable conditions may be set. For example, the stoichiometry threshold may be set at 150%, while the temperature and pressure at 100%. The settings may be established such that windup problems are avoided, while lower compressor 335 use occurs. One way windup could otherwise occur is described as follows: a stoichiometry setpoint of 100% could cause a higher airflow as soon as actual RH exceeds 100%. If there is only a little overshoot in airflow the RH would drop below 100% and the pressure setpoint would rise. A pressure overshoot then would make RH go above 100% again and again cause higher airflow so finally the system ends up at either a maximum pressure or a maximum airflow. This circumstance is exacerbated by temperature control also coming into play. To avoid the windup problem, the RH setpoint applicable for the stoichiometry control can be set at a different level than those for control of the temperature and/or pressure. If the first setpoint is considerably higher (for example, 150% compared to 100%), airflow would only be increased if the system is really away from this nominal operating condition and there is no danger of momentarily too high airflow pushing the RH below the setpoint for the pressure control. While a proper temperature setpoint affects RH and therefore is needed nearly all of the time during operation and a pressure setpoint comes into play every time the coolant loop 340 cannot prevent the system 1 from going to higher temperatures than the temperature setpoint (i.e. continuously at high ambient temperatures), an increased stoichiometry should only be necessary in rare situations. Therefore an RH setpoint for the stoichiometry control higher than the originally intended setpoint for overall RH control is acceptable. Furthermore, a higher RH setpoint will prevent a highly power consuming increase of the airflow (i.e. compressor speed) from occurring too often.

Secondly, the temperature setpoint is based on a backpressure estimation for fully open backpressure valve 337, which corresponds to the lowest possible backpressure at the actual airflow. Thus, it is desirable to execute a model that gives a minimum pressure value (such as when backpressure valve 337 is fully opened). The backpressure estimation itself adds the ambient pressure readings to the output of an adaptive pressure drop algorithm, which calculates the quadratic coefficient a of a second order polynomial which can be adapted any time that the real backpressure valve 337 is in the fully open position:

$$p_{out\,min\,est} = p_{amb} + a\dot{V}^2_{air} + b\dot{V}_{air} \qquad (4)$$

where a and b are parameters that are tuned to the specific configuration of the application into which system 1 is placed, $\dot{V}_{air}$ equals air mass flow (and where the squared term takes into account turbulence effects) and p equal the respective ambient and estimated cathode outlet minimum pressures. This estimate of the minimum backpressure occurs with the backpressure valve 337 in a fully open position. Accordingly, this value is always larger than the ambient condition. When the valve is fully opened, the model is not needed, at which time actual pressure reading values can be taken and the parameters a and b adapted. The adaptation enables a single software set for different applications with different cathode exhaust backpressures. In addition, it covers variations in backpressure during runtime; such variations can be due to changes occurring in the system, for example, dirt forming in the exhaust system. The temperature and pressure setpoints are as follows:

$$p_{sat H2O\,outest} = \frac{y_{H2O\,outest} * p_{out\,min\,est}}{rH_{outdes}} \quad (5)$$

and $$T_{coolantoutdes} = f(p_{sat H2O\,des}) \quad (6)$$

where $f(p_{satH2Odes})$ is the inverse function of the Antoine water saturation pressure curve. As stated before, it is beneficial to use the fraction as function of desired stoichiometry at the load setpoint rather than at the actual load. From these setpoints, the molar fraction of equation (3) can be calculated. This is a way to come up with the desired coolant setpoint for manipulation of the radiator bypass valve 347 and the fan 343.

The pressure setpoint at the outlet of the cathode flowpath 336 is derived online from the actual coolant temperature and cathode outlet fraction estimation, so changes of the minimal stoichiometry values can be compensated in real time during operation of the system 1:

$$p_{des} = \frac{rH_{outdes} * p_{sat H2O}}{y_{H2O\,est}} \quad (7)$$

with $$p_{sat H2O} = f(T_{coolantout}) \quad (8)$$

where $p_{des}$ is the pressure setpoint at the cathode outlet and $p_{satH2O}$ defines the Antoine water pressure saturation curve. Thus, the pressure setpoint can be derived from the actual temperature without the disadvantage of the windup condition, as the temperature setpoint is not a function of the actual pressure. It can also be seen that is preferable to base the temperature setpoint on an optimal pressure model in order to finally achieve such optimal pressure instead of targeting an optimal temperature. In attaining the actual temperature of the latter approach, the resulting pressure may cause additional compressor load. Thus, lowering temperature to maintain RH usually takes less parasitic energy than increasing pressure.

The use of the molar fraction estimation based on the load setpoint and corresponding minimal stoichiometry in the denominator of equation (7) avoids pressure setpoint fluctuation even if the actual load temporarily does not match the load setpoint. This is applied to system 1, where a pressure control algorithm defines a pressure setpoint based on the actual coolant outlet temperature. This pressure setpoint is converted into a position command for backpressure valve 337. If this command equals a fully open position, the cathode exhaust path backpressure model is adapted so that it matches the actual difference between stack cathode outlet pressure and ambient pressure, taking the actual mass flow of air through the cathode flowpath 336 into account. If the command over the backpressure valve 337 is different from the fully open setting, the adaption is stalled, and the actual outlet pressure in the cathode flowpath 336 has no further impact. A teinpcrature control algorithm always computes the termiperature setpoint based on the model output. In the present context, the term "model" is used for software that generates a virtual sensor reading out of readings of physically existing sensors, while (control) algorithms generally generate setpoints (position, temperature, pressure or the like) out of real or virtual sensor readings. In addition, models as well as algorithms could form a kind of hierarchy, where models could take virtual readings in addition to real readings or just virtual readings to generate further virtual readings. An algorithm could receive a pressure setpoint as input and generate a backpressure valve position as output, in this way providing cascaded control.

The model can be adjusted at run time when the backpressure valve 337 is fully open. Thus, by the present invention, a controller 1000 for fuel cell system 1 can achieve and maintain the best relative humidity setpoint by changing (preferably minimizing) the speed of the compressor 335, the position of the backpressure valve 337, and temperature of the fluid flowing through the cathode flowpath 336. It will be recalled that the stack cathode outlet relative humidity setpoint is generally dependent on stack technology and not on operating conditions such as temperature, pressure or the like. Hence, this setpoint is a fixed parameter in the software that is not changed during normal operation.

The method of the present invention can also be used in a system with parallel cathode offgas paths. In such a configuration, parallel backpressure valves (similar to backpressure valve 337) can be controlled in a way that the pressure drop does not change if the flow is shifted from one path to the other. This allows the aforementioned pressure assumption to remain valid.

Figure 5:
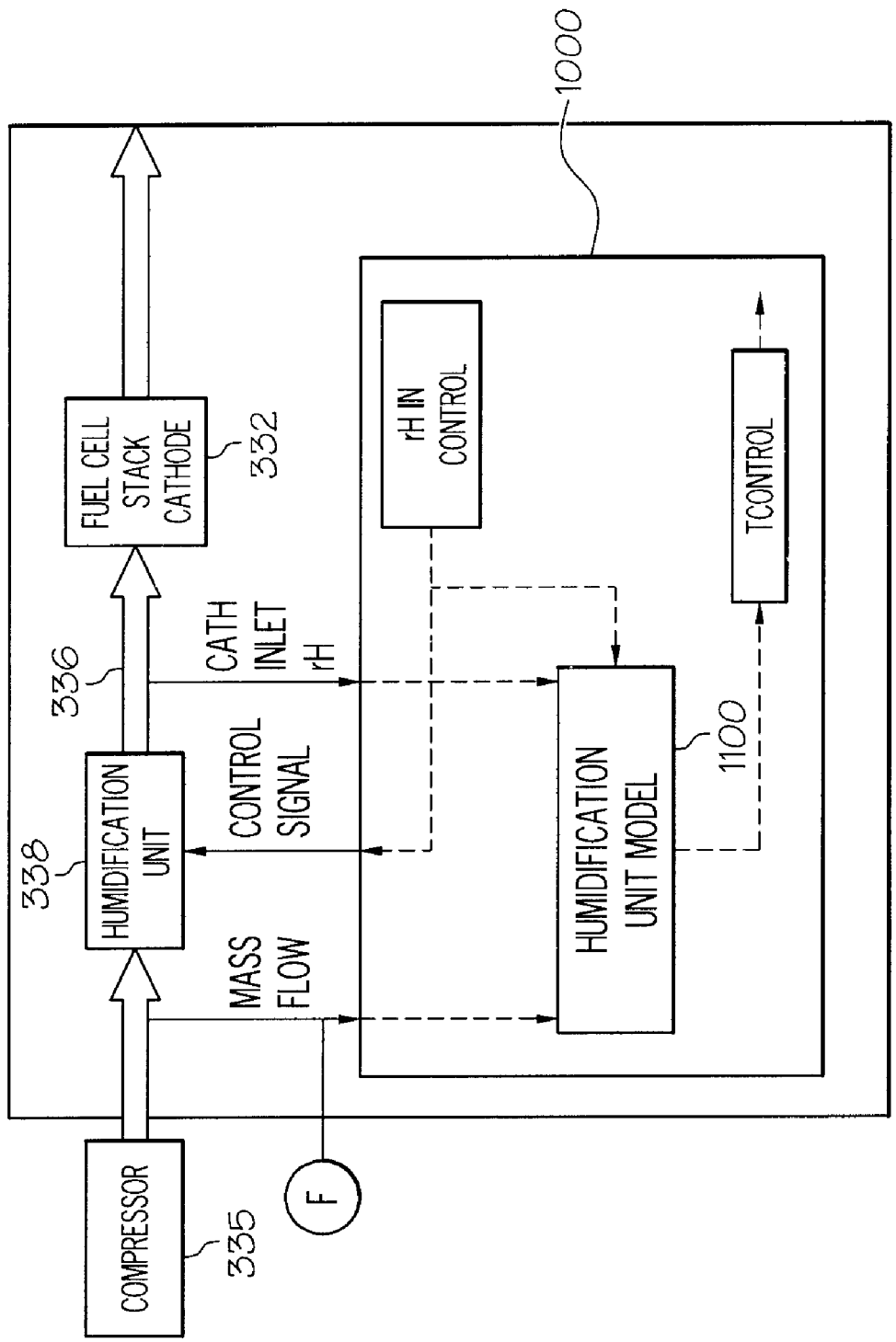
FIG. 5 shows an alternate embodiment where a humidification unit is employed to help regulate the relative humidity of the fuel cell stack of FIG. 2.

In another approach, cathode inlet humidification can be used, as shown with particularity in FIG. 5. In this case, a device, such as a water vapor transfer unit 338, can be coupled to system 1 through cathode flowpath 336. Assuming as much as possible relative humidity is best for the stack 3000, the temperature setpoint can be based on the minimal stochiometry, the estimated minimal backpressure and in this case additionally the maximal achievable inlet relative humidity at the desired load. The maximal achievable inlet relative humidity would require a model of the humidification device comparable to the cathode exhaust path pressure drop model described above. The following equation describes how the stack outlet water fraction can be calculated from the stack inlet water fraction. It will be appreciated that it does not provide a model for performance of certain components, such as a water vapor transfer unit.

$$y_{H2O\,outest} = \frac{2 * y_{O2\,in} + \lambda * y_{H2O\,inest}}{y_{O2\,in} + (y_{H2O\,in} + 1) * \lambda} \quad (9)$$

where $y_{H2Oinest}$ is the molar water fraction in the cathode flowpath 336 between the outlet of the humidification device and the inlet of stack 3000. The value is the output of the humidification device model 1100, which would be adapted while the humidification device 338 is operated with maximum performance, and made to calculate the possible maximum performance while the actual performance needs to be reduced. This will drive the system 1 to the optimal temperature and enable maximal inlet relative humidity as well as lowest possible pressure while maintaining the relative humidity outlet requirement, even if the actual inlet relative humidity has to be lowered to compensate for temperature deviations or other transient effects.

This could be implemented in system 1 in the following way. The relative humidity in the setpoint algorithm 1200 controls the performance of the humidification unit 338 by the control signal 1210 that can change, for example, a valve position (not shown). Every time maximal performance is requested, the model output for the water transfer rate T is adapted in order to match the actual cathode inlet relative humidity. If the inlet relative humidity needs to be lowered in order to compensate for transient deviations, the adaptation is stopped and the model estimates the water fraction at the inlet of stack 3000 assuming maximal humidification performance and the desired air mass flow. The temperature setpoint algorithm 1300 always uses the model output to achieve the optimal setpoint where the full humidification performance can be used without a too high relative humidity at the outlet of stack 3000.

While certain representative embodiments and details have been shown for purposes of illustrating the invention, it will be apparent to those skilled in the art that various changes may be made without departing from the scope of the invention, which is defined in the appended claims.

What is claimed is:

1. A fuel cell system comprising:
at least one fuel cell comprising an anode, a cathode and an electrolyte disposed between said anode and said cathode;
an anode flowpath configured to convey a first reactant to said anode;
a cathode flowpath configured to convey a second reactant to said cathode;
a cooling loop in thermal communication with at least one of said anode flowpath and said cathode flowpath;
at least one pump fluidly coupled to said cathode flowpath;
at least one valve fluidly disposed in said cathode flowpath;
a plurality of sensors coupled to said cathode flowpath such that upon passage of said second reactant adjacent said plurality of sensors, said plurality of sensors generate a signal corresponding to said second reactant, said plurality of sensors comprising at least one mass flow sensor, at least one temperature sensor and at least one pressure sensor to sense at least one of a temperature, a pressure, and a stoichiometry associated with said second reactant; and
a controller signally coupled to said plurality of sensors and configured to operate at least one of said pump and said valve in response to changes in a desired relative humidity of said second reactant in said cathode flowpath in order to maintain said desired relative humidity within a prescribed range, said desired relative humidity selected independent of said temperature, said pressure, and said stoichiometry, said controller configured to correlate at least one of a temperature setpoint based on a desired stoichiometry and an optimum pressure, a pressure setpoint based on a temperature, and a stoichiometry setpoint based on said desired stoichiometry established therein to an operating condition of said system such that said maintaining said relative humidity is substantially achieved while keeping said pressure and temperature setpoints operably decoupled from one another in order to avoid windup oscillations in said system while also minimizing said stoichimetry setpoint at said operating condition.

2. The system of claim 1, wherein said cooling loop comprises a pump, a radiator, a bypass valve and a fan.

3. The system of claim 2, wherein at least said bypass valve is signally coupled to said controller such that upon attainment of a certain temperature threshold, said controller can actuate said bypass valve to adjust a flow of coolant through said radiator.

4. The system of claim 2, wherein at least said fan is signally coupled to said controller such that upon attainment of a certain temperature threshold, said controller can actuate said fan to adjust a temperature of coolant flowing through said cooling loop.

5. The system of claim 1, wherein said temperature setpoint is derived from said stoichiometry setpoint.

6. The system of claim 1, wherein said temperature setpoint is based on a minimum backpressure value that corresponds to said backpressure valve being in a fully open condition.

7. The system of claim 1, wherein said controller is configured to determine said maintained relative humidity in real-time while said system is operating.

8. The system of claim 1, further comprising a humidification device fluidly coupled to said cathode flowpath and signally coupled to said controller such that upon attainment of an appropriate signal from said controller, said humidification device can contribute to said maintaining said relative humidity.

9. The system of claim 1, further comprising a vehicle cooperative therewith such that said system is a source of motive power for said vehicle.

10. The system of claim 9, wherein said vehicle comprises:
a platform configured to carry said source of motive power;
a drivetrain rotatably responsive to output from said source of motive power, said drivetrain connected to said platform; and
a plurality of wheels connected to said drivetrain.

11. The system of claim 1, wherein said temperature setpoint is based on an optimal pressure such that maintenance or attainment of a preferred relative humidity level occurs with a minimal amount of parasitic power consumption from said at least one fuel cell.

12. A method of operating a fuel cell system, said method comprising:
configuring said system to comprise an anode, a cathode, an electrolyte disposed between said anode and said cathode, an anode flowpath configured to convey a first reactant to said anode; a cathode flowpath configured to convey a second reactant to said cathode, a cooling loop in thermal communication with at least one of said anode flowpath and said cathode flowpath, and a plurality of flow modification devices coupled to said cathode flowpath;
introducing said second reactant into said cathode flowpath;
sensing at least one of a temperature, a pressure and a stoichiometry associated with said second reactant;
selecting a desired relative humidity independent of said temperature, said pressure, and said stoichiometry;
selecting a temperature setpoint based on a desired stoichiometry and an optimum pressure;
selecting a pressure setpoint based on said temperature; and
manipulating at least one of said plurality of flow modification devices in response to at least one of said temperature, said pressure, and said stoichiometry associated with said second reactant to substantially attain said desired relative humidity, or in event said desired relative humidity has been substantially attained, to substantially maintain said desired relative humidity at said substantially attained level, said manipulating at least one of said plurality of flow modification devices based on an algorithm cooperative with said controller that minimizes operation of active ones of said plurality of flow modification devices while keeping said sensed pressure and temperature algorithmically decoupled from one another in order to avoid windup oscillations in said system.

13. The method of claim 12, wherein said active ones of said plurality of flow modification devices comprise electrically-powered devices.

14. The method of claim 13, wherein said electrically-powered devices comprises at least one of a cooling fan and a compressor.

15. The method of claim 14, wherein said cooling fan is in thermal communication with said cooling loop that is in turn in thermal communication with said cathode flowpath.

16. The method of claim 14, wherein said compressor is in fluid communication with said cathode flowpath.

17. The method of claim 12, further comprising configuring a humidification device to be in fluid communication with said cathode flowpath, said humidification device responsively coupled to said controller and configured to selectively introduce additional humidity into said cathode flowpath.

18. The method of claim 12, wherein a temperature setpoint is based on an optimal pressure such that maintenance or attainment of said relative humidity occurs with a minimal amount of parasitic power consumption from said fuel cell system.

19. A method of regulating relative humidity in a fuel cell system, said method comprising:
    sensing at least one of a temperature, a pressure and a flowrate associated with fluid flow through a cathode flowpath of said system;
    selecting a desired relative humidity independent of said temperature, said pressure, and said stoichiometry;
    introducing said fluid flow into said cathode flowpath;
    selecting a temperature setpoint based on a desired stoichiometry and an optimum pressure;
    selecting a pressure setpoint based on said temperature; and
    adjusting at least one of said temperature, pressure and stoichiometry associated with said fluid flow to substantially attain said desired relative humidity, or in event said desired relative humidity has been substantially attained, to substantially maintain said desired relative humidity at said substantially attained level, said adjusting configured to minimize a parasitic power loss associated with operation of said system while keeping said adjusted pressure and temperature operably decoupled from one another in order to avoid windup oscillations in said system.

20. The method of claim 19, wherein said parasitic power loss comprises power loss associated with operation of at least one of a compressor fluidly coupled to said cathode flowpath and a fan thermally coupled to said cathode flowpath.

21. The method of claim 19, wherein a desired level of said pressure is based at least in part on said temperature and a desired temperature level in turn based on an optimal pressure such that maintenance or attainment of said desired relative humidity occurs with said minimized parasitic power loss.

* * * * *